June 14, 1966 D. E. ST. JOHN ET AL 3,256,488

PULSE GENERATOR HAVING CONTROLLABLE PULSE WIDTH AND REPETITION RATE

Filed July 17, 1963 2 Sheets-Sheet 1

INVENTORS:
Dale E. St. John
Robert D. McIntosh
By Smyth, Roston & Pavitt
Attorneys June 14, 1966 D. E. ST. JOHN ET AL 3,256,488

PULSE GENERATOR HAVING CONTROLLABLE PULSE WIDTH AND REPETITION RATE

Filed July 17, 1963 2 Sheets-Sheet 2

INVENTORS:
Dale E. St. John
Robert D. McIntosh

By Smyth, Roston & Pavitt
Attorneys

United States Patent Office 3,256,488

Patented June 14, 1966

3,256,488

PULSE GENERATOR HAVING CONTROLLABLE PULSE WIDTH AND REPETITION RATE

Dale E. St. John, Rolling Hills Estates, and Robert B. McIntosh, Inglewood, Calif., assignors to Arnoux Corporation, Culver City, Calif., a corporation of California Filed July 17, 1963, Ser. No. 295,716
12 Claims. (Cl. 328—61)

Figure 1:
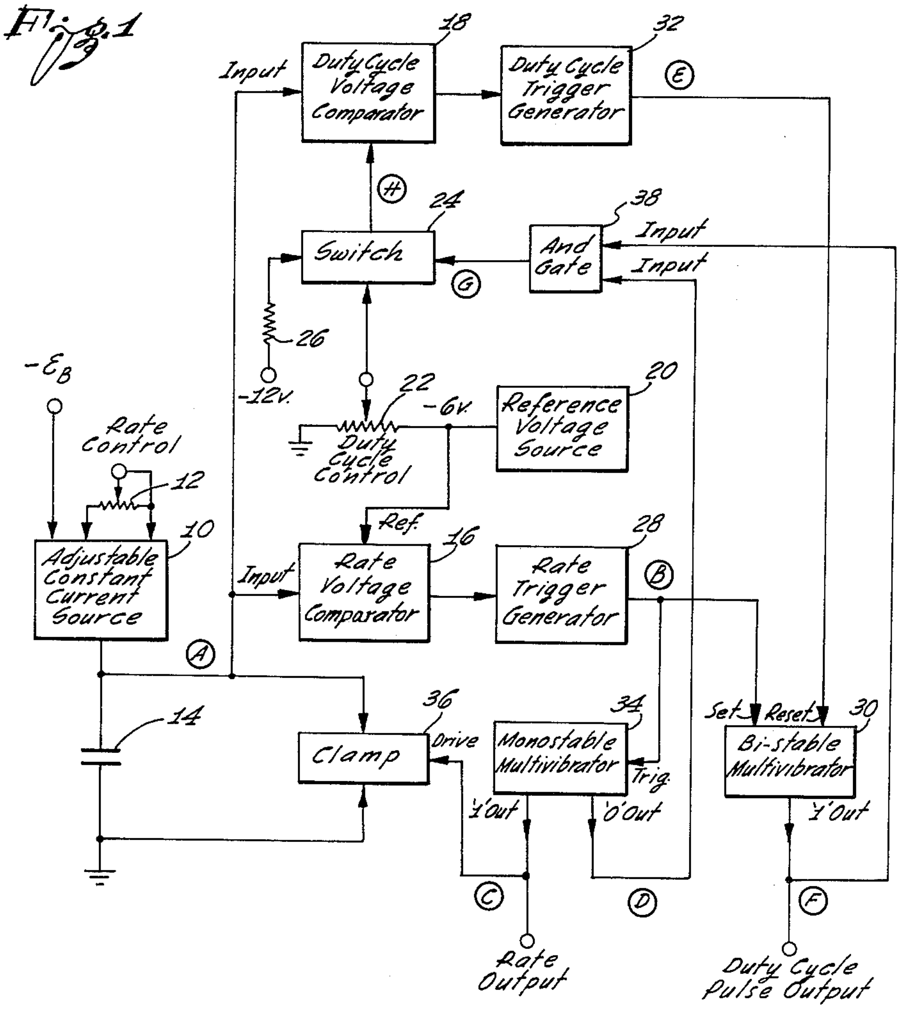

This invention relates to a pulse generator. More specifically, the invention relates to a pulse generator which produces a wave train of voltage pulses wherein the repetition rate and duty cycle of the pulses are variable. The repetition rate of the wave train refers to the number of pulses which are generated during a particular time period. The duty cycle of the wave train refers to the percentage described by the relationship of the pulse width to the width of a complete pulse period. The invention also contemplates maintaining the pulse duty cycle constant while the pulse repetition rate is varied.

In the prior art there have been developed many methods for electronically generating a wave train of voltage pulses. All of these prior methods, however, do not perform the desired functions as discussed above. For example, one known prior art method of generating a wave train of pulses is an astable multivibrator circuit. In the circuit, while the pulse rate can be adjusted, it is difficult to maintain a constant duty cycle due to interaction among the circuit components. Also, the range of duty cycle adjustment is limited due to the long recovery time of the circuit.

Another known method of generating a pulse train is in the use of a free-running blocking oscillator. This circuit, however, has deficiencies since it is difficult to adjust the pulse rate over a wide range and also the duty cycle is usually low and cannot be adjusted over a wide range. A final example of a known circuit which generates a pulse wave train is a relaxation oscillator. In this circuit, however, a pulse with an adjustable duty cycle is not generated since the output of the relaxation oscillator is usually a voltage ramp.

The pulse generator of the present application overcomes the deficiencies of the prior art circuits and has the following advantages: First, the pulse repetition rate is easily adjustable over a wide range by the variation of a single resistance element. Second, the repetition rate is very stable. Third, the pulse duty cycle is easily adjustable from near zero to 100% by the variation of a single resistive voltage divider, and, finally, the duty cycle remains constant at the selected percentage as the pulse rate is varied over the entire pulse rate range.

Broadly, the pulse generator consists of a bistable circuit which is triggered back and forth between its two stable states by two separate trigger pulses. A charging circuit produces a voltage ramp having a linear voltage change with respect to time. The voltage ramp is applied as an input to two voltage comparators. A reference voltage is applied to each of the voltage comparators. The first one of the reference voltages is maintained at a fixed value while the second one may be varied to have a fixed percentage of the first reference voltage. Each voltage comparator produces a trigger pulse when the input from the voltage ramp equals the particular reference voltage applied to the voltage comparator. The trigger pulses control the bistable circuit to produce the output pulses. By adjusting the slope of the voltage ramp, the repetition rate of the output pulses can be varied without changing the duty cycle.

Also, by varying the value of the second reference voltage the duty cycle of the output pulses can be varied without changing the repetition rate.

The invention also contemplates disabling the one voltage comparator which is referenced at the lower voltage value as soon as this voltage comparator produces an output signal. This eliminates an excess current drainage on the charging circuit and insures the proper operation of the other voltage comparator.

Figure 2:
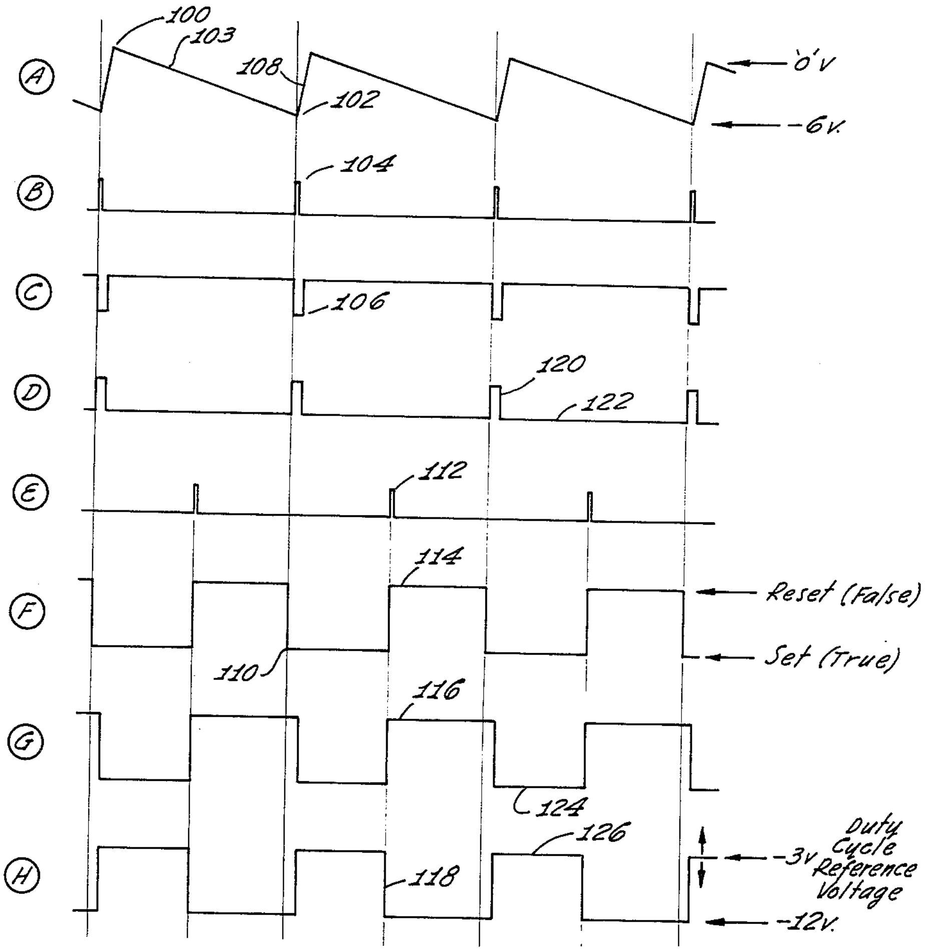

A clearer understanding of the invention will be had upon an examination of the drawings, wherein:

FIGURE 1 is a block diagram of a circuit for producing a wave train of voltage pulses, and FIGURE 2 depicts the waveform of the signals at various points in the circuit shown in FIGURE 1. These signals are labeled A through H.

In FIGURE 1 an adjustable constant current source 10 is controlled by a potentiometer 12. The constant current source 10 is supplied with a voltage of $-E_B$. A capacitor 14 is disposed between the output of the current source 14 and a reference potential such as ground. The voltage across the capacitor 14 increases linearly as the constant current source 10 charges the capacitor 14. The voltage across the capacitor 14 is applied as input voltages to a rate voltage comparator 16 and a duty cycle voltage comparator 18. A voltage source 20 may supply a reference voltage having a value on the order of −6 volts to the rate voltage comparator 16. A potentiometer 22, which serves as a duty cycle control, is disposed between the voltage source 20 and the reference potential such as ground. The movable arm of the potentiometer 22 is connected to a first input of a switch 24. A voltage having a value, for example, of −12 volts, is applied through a resistor 26 to a second input of the switch 24. The output of the switch is connected to the duty cycle voltage comparator 18 to act as a reference voltage for this comparator.

The output signal from the rate voltage comparator 16 is applied to a rate trigger generator 28. The trigger generator is connected to the set input of a bistable multivibrator 30. The output signal from the duty cycle voltage comparator 18 is applied to a duty cycle trigger generator 32 and the output of the duty cycle trigger generator 32 controls the reset input of the bistable multivibrator 30. The output from the rate trigger generator 28 is also applied as a trigger input to a monostable multivibrator 34.

A clamp 36 is disposed across the capacitor 14. The clamp 36 is driven by the 1 output of the monostable multivibrator 34. The 0 output of the monostable multivibrator 34 is applied as an input to an AND gate 38. The second input to the AND gate 38 is from the 1 output of the bistable multivibrator 30. The output of the AND gate 38 is used to control the switch 24. The duty cycle pulse output is taken from the 1 output of the bistable multivibrator 30 and a rate output is taken from the 1 output from the monostable multivibrator 34.

The operation of the pulse generator shown in FIGURE 1 will be understood with reference to the signal waveforms illustrated in FIGURE 2. The various waveforms are marked A through H and indexed at appropriate places in FIGURE 1 to illustrate where the signal appears within the circuit. As an initial assumption, the voltage source 20 may produce a reference voltage on the order of −6 volts. Also, the duty cycle potentiometer 22 may be adjusted at its middle position to provide a reference voltage on the order of −3 volts.

Capacitor 14 is charged toward the negative potential $-E_B$ by current from the adjustable constant current source 10. The rate at which the capacitor is charged is determined by the potentiometer 12 which controls the amount of charging current. As shown in waveform A of FIGURE 2, the capacitor 14 charges from a value of 0 volts illustrated at point 100 to a value of −6 volts shown at point 102 to produce a linear voltage ramp 103.

As shown in FIGURE 1, the voltage at point A is compared with the reference voltage produced by the voltage source 20 in the rate voltage comparator 16. When the voltage at point A reaches a value of −6 volts, the rate voltage comparator 16 produces an output signal which is applied to the rate trigger generator 28. The rate trigger generator 28 produces an output pulse 104 as shown in waveform B of FIGURE 2.

The output pulse 104 from the rate trigger generator 28 triggers the monostable multivibrator 34 to produce a 1 or true output from the monostable multivibrator. This 1 or true output is shown as pulse 106 in the waveform C of FIGURE 2. The output pulse 106 has a particular time period depending on the time constant of the monostable multivibrator. The output pulse 106 may be used as a rate output pulse signal. The rate output pulse signal which appears at the point C in FIGURE 1 has a constant pulse width but a variable repetition rate dependent upon the setting of the rate control potentiometer 12. The pulse signal 106 also drives the clamp circuit 36 to discharge the capacitotr 14 back to zero volts. Since an appreciable period of time is required for the capacitor 14 to be fully discharged, as shown by the portion of the curve A marked 108, the pulse output from the monostable multivibrator 34 is designed to have a pulse width of a sufficient period of time to fully discharge the capacitor 14. When the clamp 36 opens, the capacitor 14 once again charges toward a negative potential. The pulse 104 from the rate trigger generator 28 also sets the bistable multivibrator 30. This is shown at point 110 in waveform F of FIGURE 2.

The voltage across the capacitor 14 is also connected to the duty cycle voltage comparator 18. Initially, the switch 24 is positioned so that the reference voltage developed by the duty cycle potentiometer control 22 is applied to the duty cycle voltage comparator 18. When the voltage at the input of the duty cycle voltage comparator 18 reaches −3 volts, the voltage comparator 18 develops an output signal which produces an output pulse from the duty cycle trigger generator 32. This is shown in waveform E by pulse output 112. The pulse 112 resets the bistable multivibrator 30 as shown at 114 in waveform F. The resetting of the bistable multivibrator also produces a false input to the AND gate 38.

The signal from the AND gate therefore changes the position of the switch 24, to apply the voltage source of −12 volts through the resistor 26 to the duty cycle voltage comparator 18. This is shown at 116 in waveform G. This switching is necessary since the duty cycle voltage comparator 18 must be effectively disconnected from the capacitor 14 or the load of the conducting voltage comparator 18 would prevent the further charging of the capacitor 14 to the −6 volt reference potential. Since capacitor 14 never charges past −6 volts, and since the voltage comparators 16 and 18 present a vary high impedance to the capacitor 14 prior to the time that the reference voltage is reached, the opening of the switch 24 restores the duty cycle voltage comparator 18 to a high input impedance condition and capacitor 14 therefore continues to charge toward its maximum voltage of $-E_B$. The reference voltage on the duty cycle voltage comparator 18 is shown by the waveform H and the switching from −3 volts to the −12 volt condition is indicated by the line 118.

It is also important to maintain a false output from the AND gate 38 even after the bistable multivibrator 30 is again triggered to the set state. This is accompished by connecting as a second input to the AND gate 38 the 0 output of the monostable multivibrator 34. The 0 output of the monostable multivibrator 34 is shown by waveform D and the pulses 120 are coincident with the discharge period of the capacitor 14. This operation of the AND gate in the foregoing manner is important so that a duty cycle trigger pulse is not generated during the capacitor 14 discharge time. After the monostable multivibrator 34 returns to its normal condition, the 0 output is once again true, as shown by line 122 of waveform D. At this time both inputs to the AND gate 38 are true and the switch 24 is reset to permit the reference potential from the duty cycle control potentiometer 22 to be applied to the duty cycle voltage comparator 18. This position of the switch 24 is as shown by line 124 of waveform G and the reference potential of −3 volts is shown by line 126 of waveform H.

As indicated above, the bistable multivibrator 30 is triggered to a set state when the capacitor 14 charges to −6 volts and is triggered to the reset state when the capacitor 14 charges to the voltage value selected by the duty cycle control potentiometer 22. Therefore, the output from the bistable multivibrator is a train of pulses having a duty cycle which can be continuously varied from a very low percentage to 100%. The minimum duty cycle is a function of the capacitor 14 discharge time. As the repetition rate of the wave train is varied by changing the rate at which the capacitor 14 is charged, the selected duty cycle remains constant since the capacitor 14 charges to the same reference voltage regardless of the charging time and the ratio of duty cycle reference voltage to rate reference voltage determines the duty cycle of the output pulse. Therefore, variations in the rate control potentiometer 12 have no effect on the duty cycle of the pulse train and, conversely, variations of the duty cycle have no effect on the repetition rate of the pulse train.

It will be understood that this invention has been disclosed and described with reference to particular illustrations but the invention is only to be limited by the appended claims.

What is claimed is:

1. A pulse generator including, first means for producing a wave train of first trigger pulses and having a time displacement of a first particular value between adjacent pulses, second means for producing a wave train of second trigger pulses and having a time displacement between adjacent pulses equal to the same value as the time displacement between the first trigger pulses, third means having first and second stable states and operatively coupled to the first and second means and responsive to the first trigger pulses for triggering the third means to the first stable state and responsive to the second trigger pulses for triggering the third means to the second stable state, fourth means operatively coupled to the third means for producing an output signal having a first level when the third means is in the first stable state and having a second level when the third means is in the second stable state, and fifth means operatively coupled to the first and second means for concurrently varying the time displacement of the adjacent pulses in both the first and second trigger pulses.

2. A pulse generator including, first means for producing a signal having a linear change from a first amplitude value to a second amplitude value, second means responsive to the signal produced by the first means for producing a wave train of first trigger pulses and having a time displacement of a first particular value between adjacent pulses, third means responsive to the signal produced by the first means for producing a wave train of second trigger pulses and having a time displacement between adjacent pulses equal to the same value as the time displacement between the first trigger pulses, fourth means operatively coupled to the first means and responsive to the trigger pulses for recycling the signal produced by the first means from the first amplitude value to the second amplitude value after the appearance of each pair of a first and second trigger pulse, fifth means having first and second stable states and operatively coupled to the second and third means and responsive to the first trigger pulses for triggering the fifth means to the first stable state and responsive to the second trigger pulses for triggering the fifth means to the second stable state, sixth means operatively coupled to the fifth means for producing an output signal having a first level when the fifth means is in the first stable state and having a second level when the fifth means is in the second stable state, and seventh means operatively coupled to the second and third means for concurrently varying the time displacement of the adjacent pulses in both the first and second trigger pulses.

3. A pulse generator including, first means for producing a wave train of first trigger pulses and having a time displacement of a first particular value between adjacent pulses;

second means for producing a wave train of second trigger pulses and having a time displacement between adjacent pulses equal to the same value as the time displacement between the first trigger pulses, third means operatively coupled to the second means for varying the phase of the wave train of second trigger pulses relative to the phase of the wave train of first trigger pulses, fourth means having first and second stable states and operatively coupled to the first and second means and responsive to the first trigger pulses for triggering the fourth means to the first stable state and responsive to the second trigger pulses for triggering the fourth means to the second stable state, fifth means operatively coupled to the fourth means for producing an output signal having a first level when the fourth means is in the first stable state and having a second level when the fourth means is in the second stable state, and sixth means operatively coupled to the first and second means for concurrently varying the time displacement of the adjacent pulses in both the first and second trigger pulses.

4. A pulse generator including, first means for producing a wave train of first trigger pulses and having a time displacement of a first particular value between adjacent pulses, second means for producing a wave train of second trigger pulses and having a time displacement between adjacent pulses equal to the same value as the time displacement between the first trigger pulses, third means including a variable impedance element operatively coupled to the second means for varying the phase of the wave train of second trigger pulses relative to the phase of the wave train of first trigger pulses, fourth means having first and second stable states and operatively coupled to the first and second means and responsive to the first trigger pulses for triggering the fourth means to the first stable state and responsive to the second trigger pulses for triggering the fourth means to the second stable state, fifth means operatively coupled to the fourth means for producing an output signal having a first level when the fourth means is in the first stable state and having a second level when the fourth means is in the second stable state, and sixth means including a variable impedance element operatively coupled to the first and second means for concurrently varying the time displacement of the adjacent pulses in both the first and second trigger pulses.

5. A pulse generator including, first means for producing a wave train of first trigger pulses, second means for producing a wave train of second trigger pulses, third means having first and second stable states and operatively coupled to the first and second means and responsive to the first trigger pulses for triggering the third means to the first stable state and responsive to the second trigger pulses for triggering the third means to the second stable state, fourth means operatively coupled to the third means for producing an output signal having a first level when the third means is in the first stable state and having a second level when the third means is in the second stable state, and fifth means operatively coupled to the first and second means for disabling the production of second trigger pulses by the second means from a time period starting immediately after the production of each second trigger pulse to a time shortly after the production of each first trigger pulse.

6. A pulse generator including, first means for producing a signal having a linear change from a first amplitude value to a second amplitude value, second means responsive to the signal produced by the first means for producing a wave train of first trigger pulses, third means responsive to the signal produced by the first means for producing a wave train of second trigger pulses, fourth means operatively coupled to the first means and responsive to the trigger pulses for recycling the signal produced by the first means from the first amplitude value to the second amplitude value after the appearance of each pair of a first and second trigger pulse, fifth means having first and second stable states and operatively coupled to the second and third means and responsive to the first trigger pulses for triggering fifth means to the first stable state and responsive to the second trigger pulses for triggering the fifth means to the second stable state, sixth means operatively coupled to the fifth means for producing an output signal having a first level when the fifth means in the first stable state and having a second level when the fifth means is in the second stable state, and seventh means operatively coupled to the second and third means for disabling the production of second trigger pulses by the third means from a time period starting immediately after the production of each second trigger pulse to a time shortly after the production of each first trigger pulse.

7. A pulse generator including, first means for producing a voltage ramp, second means for producing a first reference voltage having a first particular value, third means for producing a second reference voltage having a second particular value and with the first reference voltage having an amplitude at least as large as the amplitude of the second reference voltage, fourth means operatively coupled to the first and second means and responsive to the voltage ramp and to the first reference voltage for producing a first control signal when the value of the voltage ramp substantially equals the first particular value of the first reference voltage, fifth means operatively coupled to the first and third means and responsive to the voltage ramp and to the second reference voltage for producing a second control signal when the value of the voltage ramp substantially equals the second particular value of the second reference voltage, and sixth means having first and second stable states and operatively coupled to the fourth and fifth means and responsive to the first control signal for triggering the sixth means to the first stable state and responsive to the second control signal for triggering the sixth means to the second state.

8. A pulse generator including,
first means for producing a voltage ramp,
second means for producing a first reference voltage having a first particular value,
third switch means having first and second input terminals and a single output terminal,
fourth means operatively coupled to the first input terminal of the third means for producing a second reference voltage having a second particular value and with the first reference voltage having an amplitude at least as large as the amplitude of the second reference voltage,
fifth means operatively coupled to the second input terminal of the third means for producing a third reference voltage having a third particular value larger than the values of the first and second reference voltages,
sixth means operatively coupled to the first and second means and responsive to the voltage ramp and to the first reference voltage for producing a first control signal when the value of the voltage ramp substantially equals the first particular value of the first reference voltage,
seventh means operatively coupled to the first and third means and responsive to the voltage ramp and to the signal at the output terminal of the third means for producing a second control signal when the value of the voltage ramp substantially equals the value of the signal at the output terminal of the third means,
eighth means operatively coupled to the third and seventh means for connecting the first input terminal to the output terminal after the appearance of the first control signal and for connecting the second input terminal to the output terminal after the appearance of the second control signal, and
ninth means operatively coupled to the sixth and second means and responsive to the first control signal for triggering the ninth means to a first stable state and responsive to the second control signal for triggering the ninth means to a second stable state.

9. A pulse generator including,
first means for producing a variable voltage ramp including an adjustable constant current source for charging a capacitor,
second means for producing a first reference voltage having a first particular value,
third means for producing a second reference voltage having a second particular value,
fourth means operatively coupled to the first and second means for producing a first control signal when the value of the voltage ramp substantially equals the first particular value of the first reference voltage,
fifth means operatively coupled to the first and third means and responsive to the voltage ramp and to the second reference voltage for producing a second control signal when the value of the voltage ramp substantially equals the second particular value of the second reference voltage,
sixth means, having first and second stable state and operatively coupled to the fourth and fifth means and responsive to the first control signals for triggering the sixth means to the first stable state and responsive to the second control signal for triggering the sixth means to the second stable state, and
seventh means operatively coupled to the sixth means for producing an output signal having a first level when the sixth means is in the first stable state and having a second level when the sixth means is in the second stable state.

10. A pulse generator including,
first means for producing a variable voltage ramp including an adjustable constant current source for charging a capacitor,
second means for producing a first reference voltage having a first particular value,
third means for producing a second reference voltage having a second particular value and with the first reference voltage having an amplitude at least as large as the amplitude of the second reference voltage,
fourth means operatively coupled to the first and second means for producing a first control signal when the value of the voltage ramp substantially equals the first particular value of the first reference voltage,
fifth means operatively coupled to the first and third means and responsive to the voltage ramp and to the second reference voltage for producing a second control signal when the value of the voltage ramp substantially equals the second particular value of the second reference voltage,
sixth means operatively coupled to the first and fourth means for discharging the capacitor included in the first means upon the appearance of the first control signal produced by the fourth means,
seventh means having first and second stable states and operatively coupled to the fourth and fifth means and responsive to the first control signal for triggering the seventh means to the first stable state and responsive to the second control signal for triggering the seventh means to the second stable state, and
eighth means operatively coupled to the seventh means for producing an output signal having a first level when the seventh means is in the first stable state and having a second level when the seventh means is in the second stable state.

11. A pulse generator including,
first means for producing a voltage ramp,
second means for producing a first reference voltage having a first particular value,
third means for producing a second reference voltage having a second particular value,
fourth means operatively coupled to the first and second means and responsive to the voltage ramp and to the first reference voltage for producing a first voltage pulse when the value of the voltage ramp substantially equals the first particular value of the first reference voltage,
fifth means operatively coupled to the first and third means and responsive to the voltage ramp and to the second reference voltage for producing a second voltage pulse when the value of the voltage ramp substantially equals the second particular value of the second reference voltage,
sixth means operatively coupled to the third means for increasing the value of the second reference voltage for a time period starting immediately after the appearance of the second voltage pulse until a time shortly after the appearance of a first voltage pulse, and
seventh means having first and second stable states and operatively coupled to the fourth and fifth means and responsive to the first voltage pulse for triggering the seventh means to the first stable state and responsive to the second voltage pulse for triggering the seventh means to the second stable state.

12. A pulse generator including,
first means for producing a ramp of voltage having a linear change from a first level to a second level,
second means for producing a first reference voltage having a first particular value,
third means for producing a second reference voltage having a second particular value, fourth means operatively coupled to the first and second means and responsive to the voltage ramp and to the first reference voltage for producing a first voltage pulse when the value of the voltage ramp substantially equals the first particular value of the first reference voltage, fifth means operatively coupled to the first and third means and responsive to the voltage ramp and to the second reference voltage for producing a second voltage pulse when the value of the voltage ramp substantially equals the second particular value of the second reference voltage, sixth means operatively coupled to the first means for recycling the ramp of voltage from the first level to the second level after the appearance of each set of voltage pulses produced by the fourth and fifth means, seventh means operatively coupled to the third means for increasing the value of the second reference voltage for a time period starting immediately after the appearance of the second voltage pulse until a time shortly after the appearance of a first voltage pulse, and eighth means operatively coupled to the fourth and fifth means and responsive to the first voltage pulse for triggering the seventh means to a first stable state and responsive to the second voltage pulse for triggering the seventh means to a second stable state.

References Cited by the Examiner

UNITED STATES PATENTS 3,170,124 2/1965 Candilis ------------ 331—111

ARTHUR GAUSS, *Primary Examiner.*

S. D. MILLER, *Assistant Examiner.*